INVENTOR
WILLIAM F. SCHMITT
ATTORNEY

INVENTOR.
WILLIAM F. SCHMITT
BY
ATTORNEY 2,713,674

FLIP-FLOP CIRCUIT USING A SINGLE CORE

William F. Schmitt, Philadelphia, Pa., assignor to Remington Rand Inc., Philadelphia, Pa., a corporation of Delaware Application June 4, 1954, Serial No. 434,464

15 Claims. (Cl. 340—167)

This invention relates to circuits having two stable states either of which may be selected by control of the input thereof, and more particularly to flip-flop circuits.

The primary object of this invention is to provide a flip-flop circuit that does not require electronic tubes.

Another object of the invention is to provide a flip-flop circuit that is simple and reliable in operation.

Still another object of the invention is to provide a flip-flop circuit which is lower in cost than other such circuits.

An additional object of the invention is to provide a flip-flop circuit which is better suited for use in electronic computers than prior art flip-flop circuits.

In this present application there is a plurality of inputs each of which feeds its own coil on the magnetic core. The input signals which pass these coils are stored in condensers. As long as the flip-flop circuit is in one stable state each of the signals on the inputs passes through its respective coil charging its respective condenser. This magnetizes the core along a saturated portion of the hysteresis loop. At the conclusion of each signal the condenser discharges and flips the core so that when the next signal arrives on the next input it will magnetize the core along the other (positive or negative) saturated portion of the hysteresis loop. A continuous sequence of signals on the two or more inputs will therefore cause the core to be magnetized along alternately one and then the other of the saturated portions of the hysteresis loop. Should the foregoing sequence be interrupted, two successive signals on one input will then shift the core so it alternately operates on the two unsaturated portions of the hysteresis loop. In the latter stable state, the impedance of the coils to input signals will be so greatly increased that the condensers will not be substantially charged. Hence, the circuit will assume a different mode of operation. An output circuit responds to the magnitudes of the input signals that flow through the coils. A more complete description of the invention follows.

In the drawings:

Figure 2 is a typical hysteresis loop of the magnetic core C of Figure 1;

Figure 3 illustrates certain input signals that may be applied to the two inputs of Figure 1; and Figure 4 illustrates two other input signals that may be applied to the two inputs of Figure 1.

Figure 1:
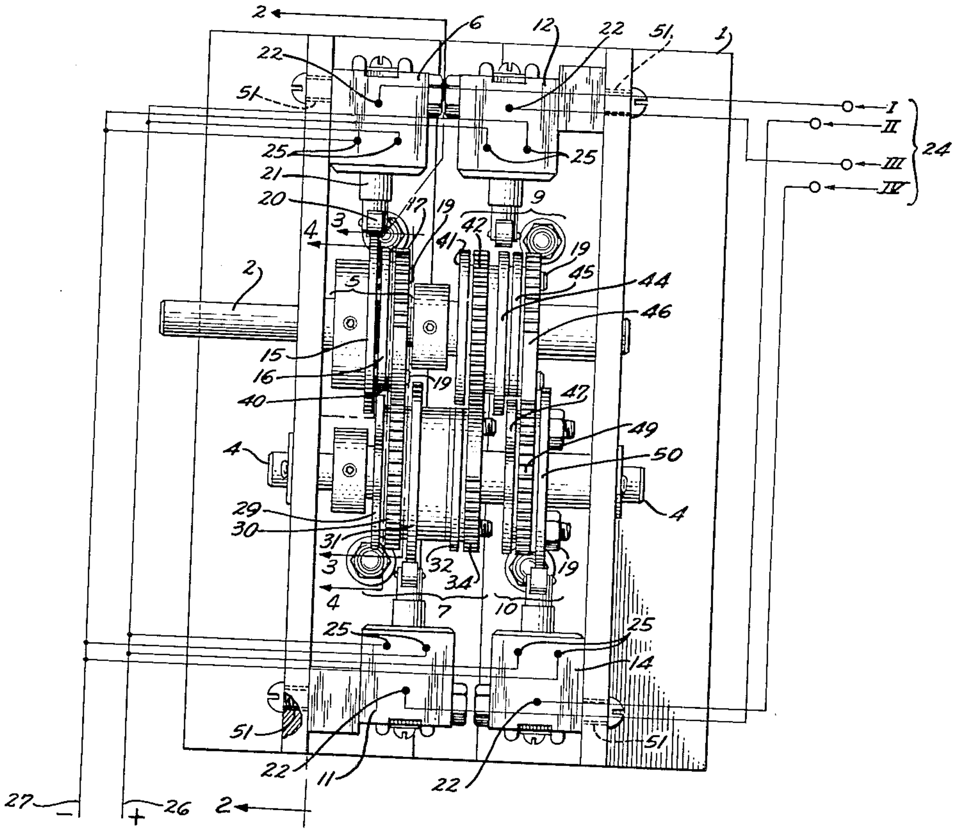
Figure 1 is a schematic diagram of the invention.

In Figure 1 the core C may be made of a variety of materials, among which are the various types of ferrites and the various types of magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 2). Cores of this character are now well known in the art. In addition to the wide variety of materials applicable, the core may be constructed in a number of geometries some including both closed and open paths. For example, cup-shaped, strips and toroidal shaped cores are possible.

Those skilled in the art understand that when the core is operating on the horizontal (or substantially saturated) portions of the hysteresis loop, the core is generally similar to an air core and the coils on the core have low impedance. On the other hand, when the core is operating on the vertical (unsaturated) portions of the hysteresis loop, the impedance of the coils on the core will be high.

In Figure 1 the flip-flop circuit has two inputs 10 and 20. For the purposes of illustration, it may be assumed that the input 10 of Figure 1 is fed by signal A of Figure 3, and the input 20 is fed by signal B of Figure 3. In such situation, it may be assumed that at the start of the operation, the core C has a residual magnetization and a residual flux density corresponding to point 7 on the hysteresis loop of Figure 2. When the positive pulse D of Figure 3 enters input 10, it flows through rectifiers 11 and 12 and resistor 13. It also traverses winding 14 and charges condenser 16. A potential also appears across resistor 15, and current also flows through rectifier 17 to output resistor 18. The reason that current may flow readily through coil 14 in response to pulse D, is that the flow of current magnetizes the core C toward saturation (see point 9 of Figure 2), and therefore since core C is in a nearly saturated state all along the path 7 to 9 of the hysteresis loop, the impedance of coil 14 is low. At the conclusion of pulse D, the magnetizing force of the core returns to zero and hence to point 7. As the potential at input 10 goes negative (see E of Figure 3), further flow through rectifier 11 is impossible. This permits condenser 16 to discharge through coil 14, rectifier 12 and resistor 13, establishing a flux density in the coil 14 in the opposite direction from that due to pulse D. This pulse is just sufficient to drive the magnetization in a negative direction from point 7 to point 8 of Figure 2. The magnetization will not, however, remain at point 8 but will inherently move to point 5, which is the position of zero magnetizing force, after the reverse surge has ceased.

The next action will be that the pulse F of Figure 3 which is impressed on input 20, flows through rectifiers 21 and 22 to ground through resistor 23. It also passes through coil 24 on core C and through resistor 25, charging condenser 26. Some current from this pulse also flows through rectifier 27 to output resistor 18. The reason that this pulse may readily flow through coil 24 is that it quickly drives the core C from point 5 to saturation point S. When the core is being operated along its nearly saturated position 5 to S, the impedance of the coil 24 is very low and current may readily pass to the condenser 26 and the output resistor 18. When negative pulse G (of the wave B of Figure 3) appears, current flow in the input 20 is blocked by rectifier 21. Therefore condenser 26 will discharge through coil 24, time periods. Assume that source A emits a pulse at time period 1, moving the core from point 7 to point 9 on the hysteresis loop of Figure 2. During period 2, the discharge of condenser 16 will flip the core from point 7 to point 8. If there were no signals on either of the inputs, the next pulse from source B at time 5 would saturate the core negatively and the next following pulse on source A would saturate it positively, etc. However, in view of a pulse on Input #1, at time period 3, the coil will be driven from point 5 to point 6 on the hysteresis loop of Figure 2 prior to the pulse from source B at time period 5. Hence the latter pulse will drive the core from point 7 to point 8 and the next succeeding pulse from source A will drive the core from point 5 to point 6. The next pulse from source B will drive the core from point 7 to point 8. Hence, the introduction of a pulse at time period 3 on Input #1 will cause the device to change from one stable state (in which the core was saturated during each pulse from sources A and B) to the other stable state in which there is no saturation of the core. In this form of the invention, the signal pulses on Input #1 are normally inserted at time period 3, that is, two spaces removed from a pulse at source A, and pulses on Input #2 are normally introduced at time period 7, that is two spaces after a pulse on source B. It is also understood that the timing of these input pulses could be modified so that the pulse on Input #1 occurred during time period 2 so that it immediately followed the pulse from source A, and thereby cancelled the reverse current which is set up by condenser 16. In such situation, the condenser 16 will not provide its usual reverse current and the subsequent operation of the device will cause it to revert to the second stable state.

Figure 5:
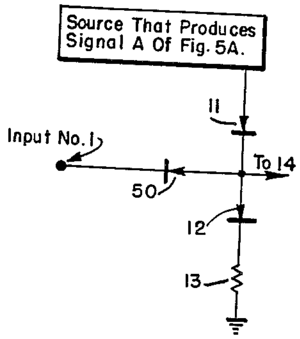
Figure 5 is a detail view showing how an input signal may be fed to the device.
Figure 5A:
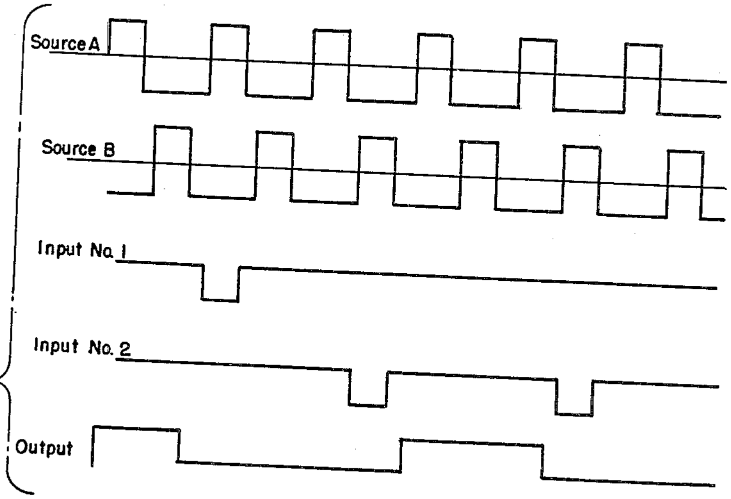
Figure 5A is a diagram of the waveforms when the input is as shown in Figure 5.
Figure 6:
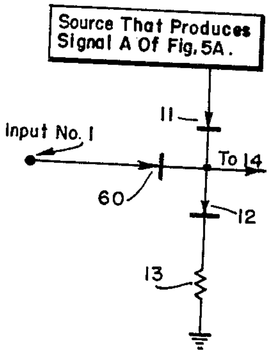
Figure 6 is a detail view showing an alternate way of feeding an input to the device.
Figure 6A:
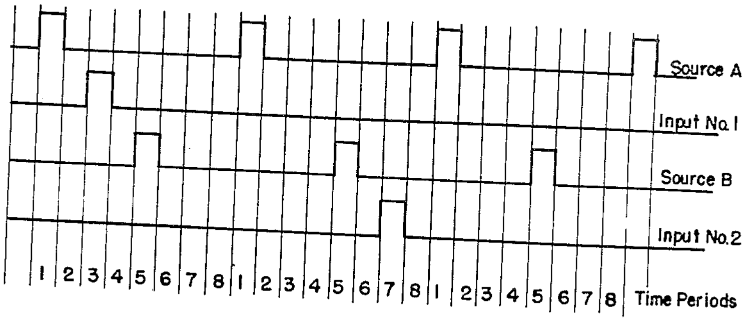
Figure 6A is a diagram of the waveforms when the input is as shown in Figure 6.
Figure 7:
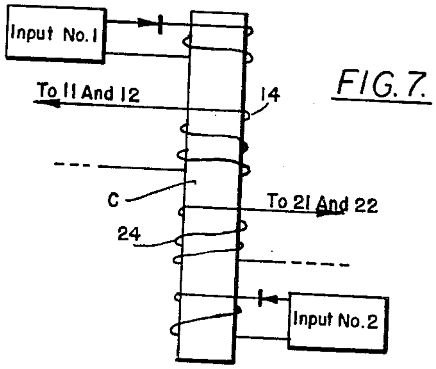
Figure 7 is a detail view of another alternate way of feeding an input to the device.

An additional way of actuating the device from one stable state to the other is shown in Figure 7. As in Figures 5 and 6, the coils 14 and 24 of Figure 7 are fed by a continuous train of pulses from sources A and B. A pulse on Input #1 of Figure 7, may be so timed and may be of such magnitude as to neutralize the magnetizing force of a pulse from source A in coil 14. Hence, one of the pulses from source A is effectively cancelled which will cause the device to flip from one stable state to the other. Likewise, a pulse at Input #2 may be so timed and be of such magnitude as to effectively cancel the magnetizing force of a current from source B through coil 24.

Figure 8:
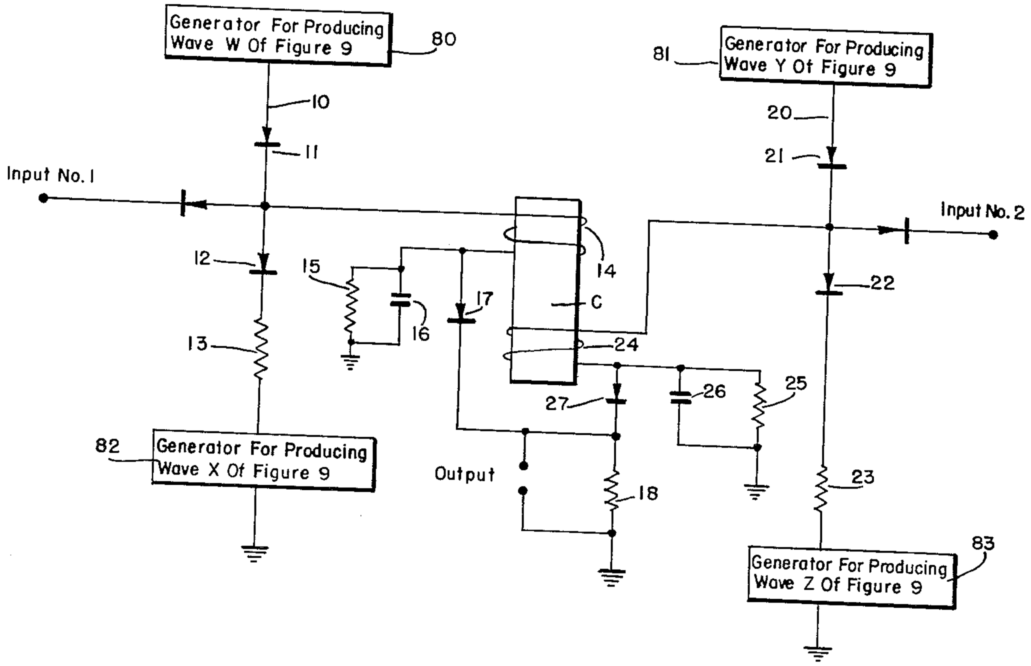
Figure 8 is a schematic diagram of a modified form of the invention.
Figure 9:
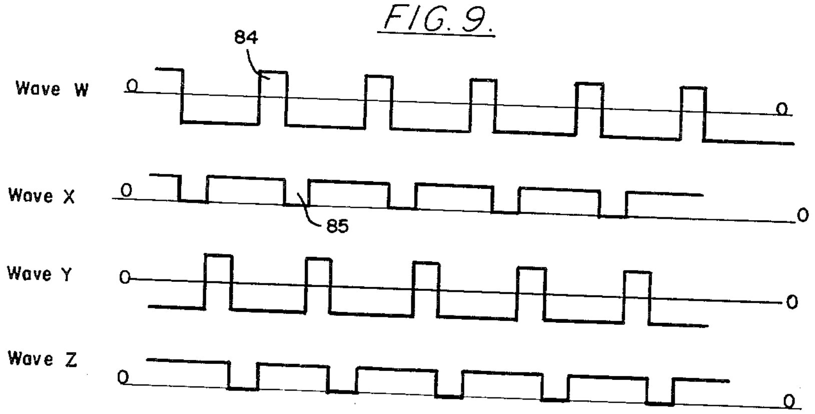
Figure 9 is a waveform diagram of the device of Figure 8.

In Figure 8, the generators 80 and 81 produce the waves W and Y of Figure 9. In order to flip the circuit from one stable state to another pulses may be fed into "Input #1" or into "Input #2." There is an uninterrupted train of pulses W from generator 80 and another uninterrupted train of pulses Y from generator 81; however a pulse on an input may cancel one of the pulses of the waves W or Y. For example, a negative pulse on "Input #1" may cancel pulse 84, which may cause the circuit to flip from one to another of its stable states. The main difference between Figure 8 and the other is, however, the addition of blocking pulse generators 82 and 83. These generators have two advantages as follows: (1) they reduce the loads on generators 80 and 81, and (2) they compensate for potentials induced in either of coils 14 and 24 due to condenser discharge current flowing in the other coil. Discussing the first of these advantages it may be said that the loads on generators 80 and 81 are reduced since the generators 82 and 83 reduce the effective potentials across resistors 13 and 23. The second of these advantages may be discussed as follows. During each discharge of condenser 26, the discharge current flows through coil 24 and induces an alternating current in coil 14. One half cycle of the current induced in coil 14 tends to flow through rectifier 12, resistor 13 to ground. This half cycle of induced current is blocked by blocking wave X since the latter is at a substantial positive value at all timer during which condenser 26 may discharge. After each positive pulse of wave W, for example pulse 84, the wave X drops to zero for a short interval (for example at 85) in order to permit condenser 16 to discharge through coil 14, rectifier 12, resistor 13, generator 81, to ground. The wave Z of generator 83 will cancel the current induced in coil 24 due to the discharge of condenser 16 through coil 14, in the same way that the wave X of generator 82 cancelled the current flow in coil 14 due to the discharge of condenser 26 through coil 24. Blocking generators such as 82 and 83 may be applied to any one of the several forms of the invention including those shown in Figures 1, 5, 6 and 7.

I claim to have invented:

1. A flip-flop circuit comprising a magnetic core which has substantially saturated and unsaturated portions of its hysteresis loop, first and second pulse producing means which produce trains of pulses which have interruptions that indicate that the circuit is to be flipped from one stable state to another, means for applying magnetomotive force to said core in response to each pulse from said first and second pulse producing means, means whereby the core presents a different one of said portions to each successive pulse when the sequence of pulses applied to the first named means changes and presents the same one of said portions to each successive pulse when the sequence of pulses applied to the first named means follows a predetermined sequence, and output means for giving an output signal that indicates whether the magnetomotive force was applied during a saturated or an unsaturated condition of the core.

2. A flip-flop circuit comprising a magnetic core the hysteresis loop of which has substantially saturated and unsaturated portions, first control means for applying magnetomotive forces to the core, second control means for applying magnetomotive forces to the core, means cooperating with the first and second control means for operating the core on saturated or unsaturated portions of the hysteresis loop depending upon the changes in the control signals on the first and second means, and output means that indicates whether or not the core is operating primarily on saturated portions of the hysteresis loop.

3. A flip-flop circuit comprising a magnetic core, first and second coils on the core, first and second circuits for respectively energizing said coils, said core having a hysteresis loop of such shape that the core has extended magnetization ranges in which the coils have high impedance and other extended magnetization ranges in which the coils have low impedance, means connected to said coils whereby when they present one of said two impedance values to the current in the first circuit that they continue to present that impedance value to such current as long as the two circuits are fed with signals in a predetermined sequence, said means shifting to present the other impedance value to the circuits when the sequence changes, and output means responsive to the current flow in said coils due to the input signals.

4. A flip-flop circuit comprising a magnetic core having a substantially rectangular hysteresis loop, two coils on the core, a first circuit for feeding current in a first direction to the first coil, a second circuit for feeding current in a first direction to the second coil, two condensers for respectively storing the energies passed through said circuits and for effecing reverse current flow through the coils after the cessation of current flow in said circuits in said first directions, the two input circuits and their complementary coils being so related that when currents flow in said first directions in the two circuits they magnetize the core in opposite senses respectively, and output means for giving a signal that varies according to the magnitude of the input signals passing said coils.

5. A flip-flop circuit comprising a magnetic core having two coils thereon, first and second inputs respectively feeding said coils, said core having a substantially rectangular hysteresis loop whereby the coils have low impedance when the core is operating on the horizontal portions of the loop and have high impedance when the core is operating on the vertical portions of the loop, means connected with the coils for operating the core primarily on one of said portions during the receipt of input pulses while such pulses are alternating from one input to the other and for shifting the operations between horizontal and vertical portions of the loop during the periods that input pulses are received in response to successive input pulses on the same input, and output means responsive to the current flow through said coils.

6. A flip-flop circuit comprising a magnetic core having two coils thereon, first and second inputs respectively feeding said coils, said core having a substantially rectangular hysteresis loop whereby the coils have high impedance when the circuit is operating on the horizontal portions of the hysteresis loop and low impedance when the circuit is operating on the vertical portions of the hysteresis loop, means connected to the coils to effect operation primarily on one of said portions during the receipt of input pulses while the input pulses are being alternately applied to said two inputs and shifts the operation primarily to the other portion during the receipt of input pulses in response to the omission of a pulse from the series of alternate pulses, and output means responsive to the magnitude of the current flow through said coils due to the input pulses.

7. A flip-flop circuit comprising a first input circuit composed of an input terminal, a first rectifier, a second rectifier, a resistor and ground all connected in series; a magnetic core having a substantially rectangular hysteresis loop; a coil on said core one end of which is connected between said rectifiers; a condenser connected between the other side of the coil and ground; a second input circuit composed of an input terminal, a third rectifier, a fourth rectifier, a resistor, and ground all connected in series; a second coil on the core one side of which is connected between the third and fourth rectifiers; a second condenser connected between the other side of the second coil and ground; output means responsive to the current flow in said coil; and means for feeding the two input terminals with pulses of such limited time and amplitude that a series of successive input pulses that alternately produce opposite magnetizing effects on the core will all occur primarily along unsaturated portions of the hysteresis loop of the core while all pulses following the first in a series that produce magnetizations in similar sense will occur along saturated portions of the hysteresis loop.

8. A flip-flop circuit comprising a magnetic core having a substantially rectangular hysteresis loop, first and second inputs, coils on said cores respectively energized according to variations on the two inputs, means cooperating with the coils for effecting magnetization of the core by input signals and for shifting the core from saturated to unsaturated, or vice versa, portions of its hysteresis loop whenever the input signals change from or to the sequence of being applied alternately to the two inputs, and means controlled by the magnitudes of the currents in said coils for giving an output signal.

9. A flip-flop circuit comprising a magnetic core having a substantially rectangular hysteresis loop, a first coil on the core, a condenser for storing the energy flow through the first coil, a second coil on the core, a condenser for storing the energy flow through the second coil, means whereby when the circuit is in its first stable state the first coil temporarily applies a magnetizing force to the core in a first direction to drive it to saturation and following this the first condenser discharges through the first coil and flips the core near to saturation in the opposite direction after which the second coil temporarily applies a magnetizing force to the core in a second direction driving it to saturation after which the second condenser is discharged through the second coil to magnetize the core in the first direction and whereby when the circuit is in its second stable state the two coils are alternately energized without substantial charge of the condensers, means for shifting the circuit from one stable state to the other by altering the sequence of magnetizing forces on the core characteristic of the stable state from which the circuit is to be changed, and output means responsive to the charges on said condensers.

10. A flip-flop circuit comprising a magnetic core having a substantially rectangular hysteresis loop, a first coil on the core, a first condenser in series with the first coil, a second coil on the core, a second condenser in series with the second coil, means cooperating with the coils and condensers for effecting a given sequence of magnetizing forces on the core when the circuit is in a first stable state and another given sequence of magnetizing forces on the core when the circuit is in a second stable state, means for shifting from any given stable state by altering the sequence of magnetizing forces characteristic of that state, and output means which has two different output states respectively characteristic of the two said stable states.

11. A flip-flop circuit comprising a magnetic core having a substantially rectangular hysteresis loop, first and second sources of spaced pulses each of which produces its pulses during spaces in the pulses of the other source, a first coil on the core in series with the first source, a first condenser in series with the first coil, a second coil on the core in series with the second source, a second condenser in series with the second coil, means whereby when the first condenser is charged by a pulse that the first condenser will discharge through the first coil at the conclusion of the pulse, means whereby when the second condenser is charged by a pulse that the second condenser will discharge through the second coil flipping the core, control means for altering the sequence of magnetizing forces on the core to flip the circuit from one stable state to another, and output means responsive to the charge on at least one of the condensers.

12. A flip-flop circuit as defined in claim 11 in which the control means includes a coil on the core which produces a flux that opposes that of one of the other coils.

13. A flip-flop circuit as defined in claim 11 in which the control means applies a potential to the circuit of one of said coils to alter the sequence of the magnetizing forces on the coil.

14. A flip-flop circuit as defined in claim 13 in which the control means produces a potential that adds another magnetizing force to the core to flip the circuit from one stable state to another.

15. A flip-flop circuit as defined in claim 11 in which the control means applies a potential that opposes one of the pulses from the source.

References Cited in the file of this patent

UNITED STATES PATENTS

| | | |
|---|---|---|
| 2,472,526 | Frazee | June 7, 1949 |
| 2,524,154 | Wood | Oct. 3, 1950 |
| 2,591,406 | Carter | Apr. 1, 1952 |

July 19, 1955

E. ACKERLIND 2,713,680

BINARY CONTACT MAKING COUNTER

Filed June 21, 1949

2 Sheets-Sheet 1

INVENTOR.
ERIK ACKERLIND
BY Herbert E. Metcalf
Attorney